US005863641A

United States Patent [19]

[11] Patent Number: 5,863,641
[45] Date of Patent: Jan. 26, 1999

Sakamoto et al.

[54] POLYESTER FILM FOR SUBLIMATION TYPE THERMAL TRANSFER PRINTING

[75] Inventors: Seiji Sakamoto; Jun Takahashi, both of Nagahama, Japan

[73] Assignee: Diafoil Hoechst Company, Ltd., Tokyo, Japan

[21] Appl. No.: 829,478

[22] Filed: Mar. 28, 1997

Related U.S. Application Data

[63] Continuation of Ser. No. 444,868, May 19, 1995, abandoned.

[30] Foreign Application Priority Data

May 19, 1994 [JP] Japan .................................... 6-105369

[51] Int. Cl.[6] .......................... B32B 27/08; B32B 27/30; B32B 27/36; B32B 37/38

[52] U.S. Cl. .......................... 428/216; 428/323; 428/336; 428/337; 428/413; 428/473.5; 428/480; 428/482; 428/483; 428/910; 428/914; 503/227

[58] Field of Search .................................... 428/413, 482, 428/483, 910, 914, 913, 323, 336, 337, 473.5, 216; 503/227

[56] References Cited

U.S. PATENT DOCUMENTS

| | | | |
|---|---|---|---|
| 4,778,782 | 10/1988 | Ito et al. | 503/227 |
| 5,185,314 | 2/1993 | Fujimura et al. | 503/227 |
| 5,223,328 | 6/1993 | Ito et al. | 428/195 |
| 5,250,497 | 10/1993 | Fujimura et al. | 503/227 |
| 5,252,533 | 10/1993 | Yasuda et al. | 503/227 |
| 5,314,861 | 5/1994 | Morohoshi et al. | 503/227 |
| 5,317,002 | 5/1994 | Onishi | 503/227 |
| 5,324,583 | 6/1994 | Ozak | 428/336 |
| 5,397,760 | 3/1995 | Hutt | 503/227 |

FOREIGN PATENT DOCUMENTS

| | | |
|---|---|---|
| 0 322 771 | 7/1989 | European Pat. Off. . |
| 0 356 904 | 3/1990 | European Pat. Off. . |
| 0 492 411 | 7/1992 | European Pat. Off. . |
| 0 541 103 | 5/1993 | European Pat. Off. . |

*Primary Examiner*—Vivian Chen
*Attorney, Agent, or Firm*—Foley & Lardner

[57] ABSTRACT

A biaxially orientated polyester film for sublimitation type thermal transfer printing having a coating layer and a sublimation type ink layer formed on the coating layer. The coating layer comprises an aqueous acrylic resin (A), an aqueous polyester (B) and an aqueous epoxy compound (C), weights of which satisfy the relationships: (1) $0.30 \leqq W_A \leqq 0.90$, (2) $0.10 \leqq W_B \leqq 0.50$, (3) $0.05 \leqq W_C \leqq 0.30$, and (4) $0.25 \leqq W_C/W_B \leqq 2$ in which $W_A$, $W_B$ and $W_C$ are weight ratios of the aqueous acrylic resin (A), the aqueous polyester (B), and the aqueous epoxy compound (C), respectively based the whole weight of the coating layer.

16 Claims, No Drawings

POLYESTER FILM FOR SUBLIMATION TYPE THERMAL TRANSFER PRINTING

This application is a continuation of U.S. application Ser. No. 08/444,868, filed May 19, 1995, now abandoned.

BACKGROUND OF THE INVENTION

1. Field of the Invention

The present invention relates to a polyester film for sublimation type thermal transfer printing. In particular, the present invention relates to a polyester film for sublimation type thermal transfer printing, which has a specific coating so that it is excellent in adhesion to a sublimation type ink layer, causes less shifting of the ink layer onto an image-receiving paper sheet, and forms a good transferred image having less dyeing of said coating layer with a sublimation type dye.

2. Description of the Related Art

A thermal transfer printing system has been widely spread since it generates clear images or characters, and also it uses a simple equipment and generates less or no noise. In particular, a sublimation ink type thermal transfer printing system is increasingly used mainly for image copying such as a video printer, since it creates better gradation than a meltable ink type one.

A binder to be contained in a sublimation type ink layer has an intimate relationship with performances of a thermal transfer printing material. If a binder which makes sublimation of the ink easy is selected, adhesion between the sublimation type ink layer and a polyester film as a substrate is deteriorated to cause a trouble that an area of the ink layer is often shifted to an image-receiving paper sheet in a thermal transfer printing step.

To improve the adhesion between the ink layer and the polyester film, it has been proposed to form a thin film at an interface therebetween by, for example, coating. However, the formation of such thin film is not easy in an industrial scale production. Particularly in these years, from economical and environmental view points, importance of recyclability is emphasized. But, the formation of a coating layer suitable for this purpose is difficult.

SUMMARY OF THE INVENTION

An object of the present invention is to provide a polyester film suitable for sublimation type thermal transfer printing, which can form a good transferred image and have recyclability.

According to the present invention, there is provided a biaxially oriented polyester film for sublimation type thermal transfer printing on a surface of which a sublimation type ink layer is to be formed, having, on said surface, a coating layer comprising an aqueous acrylic resin (A), an aqueous polyester (B) and an aqueous epoxy compound (C), weights of which satisfy the following relationships:

(1) $0.30 \leqq W_A \leqq 0.90$ (2) $0.10 \leqq W_B \leqq 0.50$ (3) $0.05 \leqq W_C \leqq 0.30$ (4) $0.25 \leqq W_C/W_B \leqq 2$ wherein $W_A$, $W_B$ and $W_C$ are weight ratios of the aqueous acrylic resin (A), the aqueous polyester (B), and the aqueous epoxy compound (C), respectively based the whole weight of the coating layer (=1).

DETAILED DESCRIPTION OF THE INVENTION

Herein, an polyester of the polyester film is intended to mean a polyester at least 80 mol % of which repeating units are ethylene terephthalate units or ethylene 2,6-naphthalate units. The polyester film of the present invention is intended to mean a film of such polyester which is biaxially oriented.

The polyester film to be used in the present invention may be produced by a per se conventional method. For example, the polyester as a raw material is supplied in a melt extruder, heated and molten, extruded through a slit-form die, and quenched to obtain a substantially amorphous sheet, and the amorphous sheet is biaxially oriented.

Preferred drawing conditions are as follows:

First, the amorphous sheet is drawn in a machine direction (longitudinal direction) at a draw ratio of 3 to 7 at a temperature of 70° to 110° C., and then in a transverse direction at a draw ratio of 3 to 7 at a temperature of 90° to 130° C. Each drawing may be carried out in multi-steps. If necessary, the oriented film may be heat treated.

A thickness of the polyester film to be used as a substrate is usually from 1 to 30 μm, preferably from 2 to 15 μm, more preferably from 3 to 10 μm.

In a preferred embodiment, a surface of the polyester film as the substrate is roughened and imparted with appropriate slipping properties to improve the processability in a film winding step during the film production, or in the production process of the thermal transfer printing material. To this end, inactive fine particles are preferably added to the polyester film. An amount of such particles is from 0.05 to 3 wt. %, preferably from 0.1 to 2 wt. %. Examples of the inactive particles are silicon oxide, titanium oxide, aluminum oxide, calcium oxide, kaolin, talc, and crosslinked polymer particles.

In the present invention, the coating layer which imparts easy adhesion properties to the film is formed on the surface of the polyester film, preferably in the polyester film production process.

Such process for forming the coating film is known as an in-line coating method, and comprises coating an aqueous coating liquid on one or both surfaces of the film, drawing the coated film at least in one direction, and optionally thermally treating the film.

Since the in-line coating method can produce the film and form the coating layer in one process, its production cost is advantageous, a product having a large width is easily obtained, a thickness of the coating layer is easily made thin, and the adhesion between the coating layer and the polyester film is good.

The coating liquid to be used in the present invention preferably comprises water as a liquid medium in view of working environment and safety, while it is possible to use additionally a small amount of a hydrophilic organic solvent to improve stability, dispersibility and coating properties of the coating liquid. This applies to each of the aqueous acrylic resin (A), the aqueous polyester (B), and the aqueous epoxy compound (C) which will be explained below.

As the hydrophilic solvent, aliphatic and alicyclic alcohols, glycols, esters, ethers, ketones, amide compounds and so on are exemplified. Specific examples of the alcohols are methanol, ethanol, isopropanol, n-butanol, etc. Specific examples of the glycols are ethylene glycol, propylene glycol, diethylene glycol, etc. Specific examples of the esters are ethyl acetate, amyl acetate, etc. Specific examples of the ethers are methyl cellosolve, ethyl cellosolve, n-butyl cellosolve, tert.-butyl cellosolve, dioxane, tetrahydrofuran, etc. Specific examples of the ketones are acetone, methyl ethyl ketone, etc. Further, acetonitrile, N-methylpyrrolidone, N,N-dimethylformamide, and so on can be used. These hydrophilic organic solvents may be used independently or in combination two or more of them.

The coating liquid may be coated on the surface of the polyester film by a per se conventional method such as reverse roll coating, gravure coating, rod coating, air doctor coating, and the like.

As explained above, the in-line coating method is preferably employed in the present invention, and the coating layer having good adhesion to the sublimation type ink layer is formed. In the present invention, the coating layer is formed from the coating liquid containing the aqueous acrylic resin, (A), the aqueous polyester (B) and the aqueous epoxy compound (C).

The aqueous acrylic resin (A) which is one of the essential components of the coating liquid in the present invention means a water-soluble or water-dispersible acrylic resin, and preferably comprises an alkyl acrylate or an alkyl methacrylate. Preferably, the aqueous acrylic resin is a copolymer comprising 30 to 90 mol % of the alkyl acrylate or methacrylate.

As an acrylic or vinyl monomer to be copolymerized, one having a functional group which imparts the hydrophilicity to the resin so that the water-dispersibility of the resin is improved, or improves an affinity of the acrylic resin to the polyester resin used as one of the coating components. Examples of such functional group are a carboxyl group or its salt form, an acid anhydride group, a sulfonic acid group or its salt form, a hydroxyl group, an epoxy group, an amido group, an alkylolamido group, and an amino group which may be substituted, an alkylolamino group or their salt forms. Preferably, a monomer having the carboxyl group or its salt form, or the acid anhydride group is copolymerized in the aqueous acrylic resin (A), in view of the crosslinkability with the aqueous epoxy compound (C). The acrylic resin (A) may have two or more functional groups.

When the content of the alkyl acrylate or methacrylate is at least 30 mol %, the adhesion of the coating layer to the sublimation type ink layer, the non-dyeing property of the coating layer with the sublimation type dye, formability of the coating layer, strength of the coating layer, and an anti-blocking property are improved. When the content of the alkyl acrylate or methacrylate is 90 mol % or less, the copolymerization of the comonomer having the specific functional group improves the water-solubility or water-dispersibility of the resin, stabilizes the coating liquid for a long time, and improves the adhesion between the coating layer and the polyester film, and increases strength and resistance to water and chemicals of the coating layer due to reactions in the layer.

An alkyl group of the alkyl acrylate or methacrylate preferably has 1 to 20 carbon atoms, and may be a straight, branched or cyclic group. Specific examples of the alkyl group are a methyl group, an ethyl group, a n-propyl group, an isopropyl group, a n-butyl group, an isobutyl group, a tert.-butyl group, a 2-ethylhexyl group, a lauryl group, a stearyl group, a cyclohexyl group, etc.

Among the copolymerizable monomers, examples of a monomer having the carboxylic acid group or its salt form or the acid anhydride group are acrylic acid, methacrylic acid, itaconic acid, maleic acid, fumaric acid, crotonic acid, their metal salts such as a sodium salt, ammonium salts, maleic anhydride, and so on.

Examples of a comonomer having the sulfonic acid group or its salt form are vinylsulfonic acid, styrenesulfonic acid, their metal salts such as a sodium salt, ammonium salts, and so on.

Examples of the comonomer having the amido group or the alkylolamido group are acrylamide, methacrylamide, N-methylmethacrylamide, methylolacrylamide, methylolmethacrylamide, ureido vinyl ether, ureidoethyl acrylate, and so on.

Examples of the comonomer having the amino group, the alkylolamino group or its salt form are diethylaminoethyl vinyl ether, 2-aminoethyl vinyl ether, 3-aminopropyl vinyl ether, dimethylamino methacrylate an amino group of which may be methyloled, and so on.

Examples of the comonomer having the hydroxyl group are 2-hydroxyethyl acrylate, 2-hydroxyethyl methacrylate, 2-hydroxypropyl acrylate, 2-hydroxyethyl vinyl ether, 5-hydroxypentyl vinyl ether, mono- or diacrylates or mono- or dimethacrylates of polyethers (e.g. polyethylene glycol, polypropylene glycol, etc.), and so on.

Examples of the comonomer having the epoxy group are glycidyl acrylate, glycidyl methacrylate, and so on.

In addition to the above comonomers, other vinyl compounds such as acrylonitrile, methacrylonitrile, styrene and its derivatives, mono- or dialkyl esters of maleic acid, fumaric acid, itaconic acid, and the like, butyl vinyl ether, methyl vinyl ketone, vinylidene chloride, vinyl acetate, vinylpyridine, vinylpyrrolidone, vinylmethoxysilane, etc. may be used.

The aqueous acrylic resin (A) may be prepared by a per se conventional polymerization method such as bulk polymerization, solution polymerization, emulsion polymerization, suspension polymerization, and the like. When the resin is prepared by the polymerization method other than the emulsion polymerization, the resin is dissolved or dispersed in water or a medium comprising water and used as the coating liquid. In such case, preferably the resin is not forcedly emulsified with a surfactant, but is self-emulsified by the hydrophilic group of the resin.

The aqueous polyester (B) to be used in the present invention means a water-soluble or water-dispersible polyester resin, and may comprise a polybasic carboxylic acid and a polyhydric hydroxy compound.

Examples of the polybasic carboxylic acid are terephthalic acid, isophthalic acid, orthophthalic acid, phthalic acid, 4,4'-diphenyldicarboxylic acid, 2,5-naphthalenedicarboxylic acid, 2,6-naphthalenedicarboxylic acid, 1,4-cyclohexanedicarboxylic acid, 2-potassium sulfoterephthalic acid, 5-sodium sulfoisophthalic acid, adipic acid, azelaic acid, sebacic acid, dodecanedicarboxylic acid, glutaric acid, succinic acid, trimellitic acid, trimesic acid, trimellitic anhydride, phthalic anhydride, p-hydroxybenzoic acid, monosodium trimellitate, and their ester-forming derivatives such as halides.

Examples of the polyhydric acid are ethylene glycol, 1,2-propylene glycol, 1,3-propylene glycol, 1,4-butanediol, 1,6-hexandiol, 2-methyl-1,5-pentanediol, neopentyl glycol, 1,4-cyclohexane-dimethanol, p-xylene glycol, bisphenol A-ethylene glycol adducts, diethylene glycol, triethylene glycol, polyethylene glycol, polypropylene glycol, polytetramethyleneoxide glycol, dimethylolpropionic acid, glycerol, sodium dimethylolpropionate, and so on.

From the above groups, at least one polybasic carboxylic acid and at least one polyhydric hydroxy compound are selected and polycondensated to obtain the polyester resin. In addition, an acryl graft polyester, which is disclosed in Japanese Patent KOKAI Publication No. 165633/1989, may be used.

The polyester (B) is preferably a coating component dissolved or dispersed in water or a medium comprising water. In this case, while the polyester (B) may forcedly dispersed in the medium by the surfactant, it is preferably a self-dispersing component which contains a hydrophilic nonionic component in the resin, for example, a polyether, or has an anionic group. More preferably, the polyester (B) is a water-soluble or dispersible polyester resin having the anionic group.

The polyester resin having the anionic group is a polyester obtained by bonding a compound having the anionic group to the polyester by copolymerization or grafting. Examples of the compound having the anionic group are sulfonic acids, carboxylic acids, phosphoric acid, and their salts such as a lithium salt, a sodium salt, a potassium salt, an ammonium salt, etc.

The aqueous epoxy compound (C) to be used in the present invention means a water-soluble or water-dispersible epoxy compound, preferably a water-soluble epoxy compound, which has at least one epoxy group, preferably at least two epoxy groups in a molecule.

Examples of the aqueous epoxy compound are glycidyl ethers of glycol, polyethers and polyols; diglycidyl ethers of carboxylic acids; amines substituted with a glycidyl group. Among them, the glycidyl ethers are preferred. Preferred examples are diglycidyl ethers of ethylene glycol or polyethylene glycol, diglycidyl ethers of propylene glycol or polypropylene glycol, diglycidyl ethers of neopentyl glycol, diglycidylesters of orthophthalic acid, di- or triglycidyl ethers of glycerol, di- or triglycidyl ethers of trimethylolpropane, polyglycidyl ethers of polyglycerol, polyglycidyl ethers of sorbitol, etc.

In the present invention, the coating liquid comprising the aqueous acrylic resin (A), the aqueous polyester (B) and the aqueous epoxy compound (C) which are present in water or the medium comprising water at the same time is coated on a surface of the polyester film and dried to form the coating layer to which the ink layer is easily adhered. The formed coating layer should satisfy some requirements.

First, the weight ratio WA of the aqueous acrylic resin (A) should be from 0.30 to 0.90, preferably from 0.40 to 0.80 with the whole weight of the coating layer being 1 (one). When the weight ratio $W_A$ is less than 0.30, the adhesion between the coating layer and the sublimation type ink layer is insufficient, so that the ink layer is shifted to the image-receiving paper sheet during the thermal transfer printing. Further, the coating layer is easily dyed by the sublimation type ink so that a sensitivity of the thermal transfer printing is worsened. Further, anti-blocking is deteriorated. When the weight ratio $W_A$ exceeds 0.90, the adhesion between the coating layer and the substrate polyester film is decreased, so that the ink layer is shifted to the image-receiving paper sheet.

The weight ratio $W_B$ of the aqueous polyester (B) should be from 0.10 to 0.50, preferably from 0.13 to 0.40 with the whole weight of the coating layer being 1 (one). When the weight ratio $W_B$ is less than 0.10, the adhesion between the coating layer and the substrate polyester film is decreased, while when the weight ratio $W_B$ exceeds 0.50, the adhesion between the coating layer and the sublimation type ink layer is deteriorated. Then, the ink layer is shifted to the image-receiving paper sheet. When the weight ratio $W_B$ exceeds 0.50, the coating layer is easily dyed by the sublimation type ink.

The weight ratio $W_C$ of the epoxy compound (C) should be from 0.05 to 0.30, preferably from 0.10 to 0.25 with the whole weight of the coating layer being 1 (one). When the weight ratio $W_C$ is less than 0.05, the strength of the coating layer is insufficient, while it exceeds 0.30, the adhesion of the coating layer to the ink layer is interfered by the excessive epoxy compound (C), or the strength of the coating layer is decreased, so that the ink layer is shifted to the ink-receiving paper sheet.

Finally, the ratio of the weight ratio $W_C$ of the aqueous epoxy compound (C) to the weight ratio $W_B$ of the aqueous polyester (B) ($W_C/W_B$) should be from 0.25 to 2. Outside this range, the adhesion of the film cannot be increased.

In addition to the above three essential components, the coating liquid may contain other ingredients in small amounts, as long as the objects of the present invention are achieved. Examples of such optional ingredients are organic or inorganic fine particles which improves anchoring or slipping properties, a defoaming agent, a coating improver, a thickener, an antistatic agent, an antioxidant, a UV light absorber, a dye, a pigment, and so on.

A thickness of the coating layer is preferably from 0.01 to 1 μm, more preferably from 0.02 to 0.5 μm. When the thickness of the coating layer is less than 0.01 μm, a uniform coating layer may not be formed so that irregular coating may appear in the product, and the adhesion between the ink layer and the coating layer may be insufficient. When the thickness of the coating layer exceeds 1 μm, an accuracy of the image forming by the sublimation type ink may be deteriorated.

When the coating liquid is coated and then dried to form the coating layer, the above compounds suffer from thermal history, so that various reactions take place, and the product has a very complicated structure having partly a crosslinked structure.

In the present invention, the coating layer may be formed on one surface or both surfaces of the polyester film. In general, the coating layer is formed on one surface of the polyester film, while a heat resistant easy slipping layer is formed on the other surface to prevent sticking to a thermal head.

The heat resistant easy slipping layer may be formed on the opposite surface, at the same time as the formation of the coating layer by the in-line coating method, or after the biaxial orientation of the coated film.

To improve the coating property of the coating liquid, or the adhesion of the coating layer to the substrate polyester film, the polyester film surface may be chemically treated or discharged before coating. In particular, the discharge treatment is effective in the present invention.

The sublimation type ink layer comprises yellow, magenta and cyan sublimation type solid dyes which are dispersed in a binder. Typical examples of the sublimation type solid dyes are as follows:

Yellow: Color Index Disperse Yellow 7, for example, Palanile Yellow 5RX (trade name) available from BASF.

Magenta: Color Index Disperse Red 60, for example, Sumikaron RED-FBL (trade name) available from Sumitomo Chemical Co., Ltd.

Cyan: Color Index Solvent Blue 108.

Ideally, the sublimation type dye sublimates quickly in a relatively narrow temperature range near the transfer temperature. Most of the dyes which are utilized in the thermal transfer printing have a molecular weight in a range between 230 and 370. The dyes of such molecular weight have the sublimation property adequate for dyeing, and further have molecular sizes which are suitable to be diffused in a material to be dyed. Preferably, their structures do not have any ionic group such as a sulfonic acid group or a carboxyl group, but have a polar group such as a hydroxyl group, an amino group, a nitro group, or a sulfone group.

As the binder of the sublimation type ink layer, one which facilitates the sublimation of the dye molecules, and in which the dye is uniformly dispersed is preferred. Examples of such binder are cellulose resins, acrylic resins, polyvinyl alcohol, polyamide, and so on.

As a content of the dye in the ink layer increases, a dyeing concentration increases. But, a higher content of the dye will cause some problem in dispersibility in the binder. A suitable content of the dye in the ink layer is preferably determined according to the required properties in the specific application.

A thickness of the sublimation type ink layer is preferably from 0.5 to 10 μm, more preferably from 1 to 5 μm.

EXAMPLES

The present invention will be illustrated by the following Examples, which do not limit the scope of the present invention in any way.

In the Examples, the properties are measured as follows:

(1) Adhesion between the sublimation type ink layer and the substrate film.

An adhesive tape ["Cellotape" (trade name) of Nichiban or "Scotch Mending Tape" (trade name) of 3M] is adhered to the sublimation type ink layer and peeled off quickly, and a degree of peeling of the ink layer is evaluated and ranked as follows:

O: Good. An area of the ink layer peeled off is less than 10%.

Δ: Insufficient. An area of the ink layer peeled off is from 10% to 50%.

X: Bad. An area of the ink layer peeled off exceeds 50%.

(2) Shifting of the sublimation type ink layer to the image-receiving paper sheet On a surface of a sheet of wood free paper having a thickness of 200 μm, an image-receiving layer having a thickness of 5 μm, which consisted of a polyester (Vironal MD-1200 (trade name) available from TOYOBO) (10 parts by weight (a solid weight. the same hereinafter) and silica (Nipsil E 220 A (trade name) available from Nippon Silica industries), was formed. Then, over the image-receiving layer, a thermal transfer printing sheet was laminated, and transfer printed with a thermal head having a resistance heater recording density of 8 dots/mm by applying a power of 0.3 W/dot for 10 milliseconds. The condition of the ink layer was observed by naked eyes to determine whether or not the ink layer was shifted to the image-receiving paper sheet, and ranked as follows:

O: No shifting.

Δ: Slight shifting, and quality of the product is poor.

X: Much shifting, and the product cannot be practically used.

(3) Recyclability

The film having the coating layer was pelletized and mixed in a raw material polyester chip for film formation in an amount of 10 wt. % based on the weight of the chip. Then, the mixture was filmed under the same conditions as those in Example 1 below, except that no in-line coating was combined. A color tone of the film and foreign particles in the film were measured and used as criteria of recyclability.

As a color tone, a "b" value was measured using a color analyzer TC-1800 MK II (manufactured by Tokyo Deshoku) according to JIS Z-8722. This value represents yellowness. The smaller b value is better.

To evaluate the content of the foreign particles, the number of large protrusions of 100 μm or larger was counted by naked eyes with polarized light (unit: number/$m^2$). The smaller number of the large protrusions is better.

The components of the coating liquid used in the Examples are as follows:

(i) Aqueous acrylic resin (A)

A1: An aqueous dispersion of an acrylic resin comprising 45 mol % of methyl methacrylate, 30 mol % of n-butyl acrylate, 20 mol % of styrene and 5 mol % of acrylic acid.

A2: An aqueous dispersion of an acrylic resin comprising 50 mol % of ethyl acrylate, 35 mol % of isobutyl methacrylate, 10 mol % of 2-hydroxyethyl methacrylate and 5 mol % of methacrylic acid.

(ii) Aqueous polyester (B)

B1: An aqueous dispersion of a polyester resin comprising 90 mol parts of terephthalic acid, 10 mol parts of 5-sodium sulfoisophthalic acid, 73 mol parts of ethylene glycol and 27 mol parts of diethylene glycol.

B2: An aqueous dispersion of a polyester resin comprising 55 mol parts of terephthalic acid, 40 mol parts of isophthalic acid, 5 mol parts of 5-sodium sulfoisophthalic acid, 60 mol % of ethylene glycol, 13 mol parts of diethylene glycol and 27 mol parts of 1,4-butanediol.

(iii) Aqueous epoxy compound (C)

C1: A water-soluble epoxy compound comprising tetraglycerol tetraglycidyl ether.

C2: A water-soluble epoxy compound comprising sorbitol triglycidyl ether.

(4) Aqueous polyurethane (D)

D1: An aqueous dispersion of a polyester polyurethane having carboxylic acid salt group (Hydran APX-101 (trade name) of Dainippon Ink Chemical Industries)

(5) Melamine compound (E)

E1: A water-soluble melamine compound comprising mononucleic, dinucleic and trinucleic materials of substantially tetra-functional methylol- or methoxymethylolmelamine.

Example 1

A mass of polyethylene terephthalate containing 0.3 wt. % of amorphous silica having an average particle size of 0.4 μm was melt extruded at 285° C. and casted on a cooling drum kept at 60° C. to obtain an unoriented film.

Then, the obtained film was drawn in a machine direction at a draw ratio of 3.5 at 95° C., and on one surface of the film, a coating liquid having the composition shown in Table 1. Then, the coated film was drawn in a transverse direction at a draw ratio of 3.6 at 110° C., followed by heat treating at 220° C.

The biaxially oriented polyester film consisted of the polyester film of 4.5 μm in thickness and a coating layer of 0.05 μm in thickness.

The recyclability of the polyester film having the coating layer was evaluated to find that it was good.

On a surface of the obtained film opposite to the coating layer, a heat resistant easy slipping layer having a thickness of 0.10 μm was formed from a mixture of 86 wt. % of a polyimide which was obtained from benzophenone-3,3',4,4'-tetracarboxylic anhydride (80 mol %) and tolylenediisocyanate (20 mol %), 7 wt. % of calcium carbonate powder having an average particle size of 0.07 μm and 7 wt. % of a fluorosilicone oil (FL-100 (trade name) available from Shinetsu Chemical Industries).

On the coating layer, a sublimation type ink layer having a thickness of 2.0 μm was formed from a composition of 10 parts by weight of KAYASET B (trade name) available from Nippon Kayaku, 15 parts by weight of cellulose acetate propionate, 2 parts by weight of silica gel, and 1 part of methylolmelamine, to form a thermal transfer recording material.

The adhesion between the ink layer and the substrate polyester film of the obtained thermal transfer recording material was good.

No transfer of the ink layer to the image-receiving paper sheet was observed.

Examples 2 and 3 and Comparative Examples 1–10

In the same manner as in Example 1 except that a composition of the coating liquid was changed as shown in Table 1, a biaxially oriented film was produced, and the properties of the sublimation type thermal transfer recording material were measured.

Comparative Example 11

In the same manner as in Example 1 except that no coating layer was formed, a biaxially oriented film was produced.

The results are shown in Table 2.

When any one of the requirements set by the present invention is not satisfied, one or some of the adhesion between the ink layer and the polyester film, the transfer of the ink layer and the recyclability are deteriorated.

TABLE 1

| Ex. | Weight ratio in the coating layer | | | | |
|---|---|---|---|---|---|
| No. | (A) | (B) | (C) | (D) | (E) |
| 1 | A1: 0.70 | B1: 0.15 | C1: 0.15 | — | — |
| 2 | A1: 0.65 | B2: 0.20 | C1: 0.15 | — | — |
| 3 | A2: 0.75 | B1: 0.15 | C1: 0.15 | — | — |
| 4 | A2: 0.70 | B2: 0.20 | C2: 0.10 | — | — |
| C. 1 | A1: 0.95 | B1: 0.03 | C1: 0.02 | — | — |
| C. 2 | A1: 0.20 | B1: 0.50 | C1: 0.30 | — | — |
| C. 3 | A1: 0.30 | B1: 0.60 | C1: 0.10 | — | — |
| C. 4 | A1: 0.85 | B1: 0.05 | C1: 0.10 | — | — |
| C. 5 | A1: 0.50 | B1: 0.10 | C1: 0.40 | — | — |
| C. 6 | A1: 0.77 | B1: 0.20 | C1: 0.03 | — | — |
| C. 7 | A1: 0.50 | B1: 0.45 | C1: 0.05 | — | — |
| C. 8 | A1: 0.60 | B1: 0.10 | C1: 0.30 | — | — |
| C. 9 | A1: 0.50 | — | — | D1: 0.50 | — |
| C. 10 | A1: 0.50 | B1: 0.30 | — | — | E1: 0.20 |
| C. 11 | — | — | — | — | — |

TABLE 2

| Ex. | Adhesion of ink layer | | Shifting of ink | Recyclability | |
|---|---|---|---|---|---|
| No. | Yellow | Cyan | layer | Color tone | Foreign particles |
| 1 | ○ | ○ | ○ | 11.3 | 0.11 |
| 2 | ○ | ○ | ○ | 12.1 | 0.09 |
| 3 | ○ | ○ | ○ | 10.8 | 0.10 |
| 4 | ○ | ○ | ○ | 13.0 | 0.09 |
| C. 1 | X | X | ○ | 11.9 | 0.09 |
| C. 2 | X | Δ | X | 10.5 | 0.06 |
| C. 3 | Δ | Δ | X | 10.7 | 0.07 |
| C. 4 | X | X | ○ | 10.9 | 0.69 |
| C. 5 | Δ | Δ | Δ | 10.6 | 0.12 |
| C. 6 | X | X | ○ | 10.6 | 0.08 |
| C. 7 | X | Δ | Δ | 10.7 | 0.07 |
| C. 8 | Δ | Δ | Δ | 10.6 | 0.11 |

TABLE 2-continued

| Ex. | Adhesion of ink layer | | Shifting of ink | Recyclability | |
|---|---|---|---|---|---|
| No. | Yellow | Cyan | layer | Color tone | Foreign particles |
| C. 9 | Δ | ○ | Δ | 28.3 | 0.09 |
| C. 10 | Δ | ○ | ○ | 25.9 | 0.05 |
| C. 11 | X | X | X | 10.3 | 0.05 |

What is claimed is:

1. A biaxially oriented polyester film for heat-sublimating transfer printing, said polyester film having on a film surface a coating layer formed from an aqueous acrylic resin (A), an aqueous polyester (B) and an aqueous epoxy compound (C), dry weights of which satisfy the following relationships:

(1) $0.30 \leqq W_A \leqq 0.90$ (2) $0.10 \leqq W_B \leqq 0.50$ (3) $0.05 \leqq W_C \leqq 0.30$ (4) $0.25 \leqq W_C/W_B \leqq 2$ wherein $W_A$, $W_B$ and $W_C$ are dry weight ratios of the aqueous acrylic resin (A), the aqueous polyester (B), and the aqueous epoxy compound (C), respectively based on the whole weight of the dry coating layer, and wherein:

said acrylic resin (A) is a copolymer comprising at least 30 mol % of an alkyl acrylate or an alkyl methacrylate and includes a functional group selected from the group consisting of a carboxyl group, a salt of a carboxyl group, and an acid anhydride group;

said polyester (B) is a water-soluble polyester comprising at least one polybasic carboxylic acid, at least one polyhydric alcohol, and an anionic group;

said epoxy compound (C) has at least two epoxy groups; and wherein a heat-sublimating transfer ink layer is formed on the coating layer.

2. The biaxially orientated polyester film according to claim 1, wherein said polyester film has a thickness of 1 to 30 μm.

3. The biaxially orientated polyester film according to claim 1, wherein said coating layer has a thickness of 0.01 to 1 μm.

4. The biaxially oriented polyester film according to claim 1, wherein the polyester film is produced by drawing an amorphous sheet in a machine direction at a draw ratio of 3 to 7 at a temperature of 70° to 110° C. and in a transverse direction at a draw ratio of 3 to 7 at a temperature of 90° to 130° C.

5. The biaxially oriented polyester film according to claim 1, wherein the polyester film comprises a polyester having at least 80 mol % of the total repeating units selected from one or more of the group consisting of ethylene terephthalate units and ethylene 2,6-naphthalate units.

6. The biaxially oriented polyester film according to claim 1, wherein the polyester film has a thickness of 3 to 10 μm.

7. The biaxially oriented polyester film according to claim 1, wherein the polyester film comprises particles in an amount of 0.05 to 3 percent by weight of the polyester film to thereby provide a roughened surface on the polyester film.

8. The biaxially oriented polyester film according to claim 1, wherein the coating layer is formed on the polyester film by an in-line coating method.

9. The biaxially oriented polyester film according to claim 1, wherein the ink layer comprises a yellow, magenta, or cyan sublimation solid dye dispersed in a binder.

10. The biaxially oriented polyester film according to claim 9, wherein the binder is selected from one or more of the group consisting of cellulose resins, acrylic resins, polyvinyl alcohols, and polyamides.

11. The biaxially oriented polyester film according to claim 1, wherein the ink layer has a thickness of from 0.5 to 10 μm.

12. The biaxially oriented polyester film of claim 1, wherein:

(1) $0.65 \leqq W_A \leqq 0.75$ (2) $0.15 \leqq W_B \leqq 0.20$ (3) $0.10 \leqq W_C \leqq 0.15$ and (4) $0.50 \leqq W_C/W_B \leqq 1.0$.

13. A biaxially oriented polyester film having on one surface a coating layer formed from an aqueous acrylic resin (A), an aqueous polyester (B) and an aqueous epoxy compound (C), dry weights of which satisfy the following relationships:

(1) $0.30 < W_A < 0.90$ (2) $0.10 < W_B < 0.50$ (3) $0.05 < W_C < 0.30$ (4) $0.25 < W_C/W_B < 2$ wherein $W_A$, $W_B$ and $W_C$ are dry weight ratios of the aqueous acrylic resin (A), the aqueous polyester (B), and the aqueous epoxy compound (C), respectively based on the whole weight of the dry coating layer, and wherein:

said acrylic resin (A) is a copolymer comprising at least 30 mol % of an alkyl acrylate or an alkyl methacrylate and includes a functional group selected from the group consisting of a carboxyl group, a salt of a carboxyl croup, and an acid anhydride group;

said polyester (B) is a water-soluble polyester comprising at least one Polybasic carboxylic acid, at least one polyhydric alcohol, and an anionic group;

said epoxy compound (C) has at least two epoxy groups;

said polyester film further comprising a heat resistant slipping layer on a surface of said polyester film opposite to the surface on which said coating layer is present.

14. The biaxially oriented polyester film according to claim 13, further comprising a heat-transfer sublimating transfer ink layer on the coating layer.

15. The biaxially oriented polyester film according to claim 13, wherein the slipping layer comprises a polyimide.

16. The biaxially oriented polyester film of claim 13, wherein:

(1) $0.65 \leqq W_A \leqq 0.75$ (2) $0.15 \leqq W_B \leqq 0.20$ (3) $0.10 \leqq W_C \leqq 0.15$ and (4) $0.50 \leqq W_C/W_B \leqq 1.0$.

* * * * *